US008477874B2

(12) United States Patent
Segal et al.

(10) Patent No.: US 8,477,874 B2
(45) Date of Patent: Jul. 2, 2013

(54) METHOD, DEVICE AND SYSTEM OF WIRELESS COMMUNICATION

(75) Inventors: Yossi Segal, Holon (IL); Oren Elkayam, Tel Aviv (IL)

(73) Assignee: Mobilicom Ltd., Tel Aviv (IL)

( * ) Notice: Subject to any disclaimer, the term of this patent is extended or adjusted under 35 U.S.C. 154(b) by 421 days.

(21) Appl. No.: 12/810,844

(22) PCT Filed: Dec. 30, 2008

(86) PCT No.: PCT/IL2008/001694
§ 371 (c)(1),
(2), (4) Date: Jun. 27, 2010

(87) PCT Pub. No.: WO2009/083978
PCT Pub. Date: Jul. 9, 2009

(65) Prior Publication Data
US 2010/0284495 A1    Nov. 11, 2010

Related U.S. Application Data

(60) Provisional application No. 61/017,833, filed on Dec. 31, 2007, provisional application No. 61/017,829, filed on Dec. 31, 2007.

(51) Int. Cl.
*H04B 1/06* (2006.01)
*H04L 27/00* (2006.01)
(52) U.S. Cl.
USPC ...................... 375/316; 455/562.1

(58) Field of Classification Search
USPC ............... 375/362, 316, 258, 347; 455/562.1, 455/63.4, 25, 101; 342/157, 384
See application file for complete search history.

(56) References Cited

U.S. PATENT DOCUMENTS

| | | | |
|---|---|---|---|
| 7,016,429 B1 | 3/2006 | Dogan et al. | |
| 2002/0109631 A1 | 8/2002 | Li et al. | |
| 2002/0154687 A1* | 10/2002 | Bierly et al. | 375/222 |
| 2003/0146870 A1* | 8/2003 | Guo et al. | 342/383 |
| 2003/0216156 A1* | 11/2003 | Chun | 455/562.1 |
| 2004/0179627 A1* | 9/2004 | Ketchum et al. | 375/267 |
| 2005/0047384 A1* | 3/2005 | Wax et al. | 370/338 |
| 2006/0023653 A1 | 2/2006 | Montalbano | |
| 2007/0211786 A1 | 9/2007 | Shattil | |
| 2010/0009717 A1* | 1/2010 | Monogioudis et al. | 455/562.1 |

OTHER PUBLICATIONS

Amr El-Keyi, Thia Kirubarajan, and Alex. B. Gershman, "Adaptive Wideband Beamforming with Robustness Against Presteering Errors", McMaster University Ontario, Canada and Darmstadt University of Technology, Darmstadt, Germany, 2006 IEEE.*

(Continued)

*Primary Examiner* — Aristocratis Fotakis
(74) *Attorney, Agent, or Firm* — Shichrur & Co.

(57) ABSTRACT

Some demonstrative embodiments include devices, systems and/or methods of wireless communication. Some embodiments include a receiver to process a wireless transmission received via a plurality of receive antennas, the receiver including a joint beamforming-synchronization module to jointly determine both a synchronization-error value and a beamforming weight vector. Other embodiments are described and claimed.

16 Claims, 6 Drawing Sheets

OTHER PUBLICATIONS

A. Pascual-Iserte, A. I. Perez-Neira and M. A. Lagunas, "An Approach to Optimum Joint Beamforming Design in a MIMO-OFDM Multiuser System", EURASIP Journal on Wireless Communications and Networking, Dec. 2004.*

IEEE Computer Society and the IEEE Microwave Theory and Techniques Society Sponsored by the LAN/MAN Standards Committee. IEEE Std 802.16e™-2005. IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum Feb. 1-28, 2006.

International Preliminary Report on Patentability for PCT application PCT/IL2008/001694 mailed on Jul. 6, 2010.

International Search Report for PCT application PCT/IL2008/001694 mailed on Apr. 9, 2009.

* cited by examiner

METHOD, DEVICE AND SYSTEM OF WIRELESS COMMUNICATION

CROSS-REFERENCE

This application is a national phase filing of PCT/IL2008/001694, filed on Dec. 30, 2008, which in turn claims the benefit of and priority from U.S. Provisional Patent application 61/017,833, entitled "Joint receive beamforming and synchronization in OFDM MIMO", filed Dec. 31, 2007; and claims the benefit of and priority from U.S. Provisional Patent application 61/017,829, entitled "Low complexity computation for MIMO feedback", filed Dec. 31, 2007, the entire disclosures of both of which applications are incorporated herein by reference.

FIELD

Some embodiments relate generally to the filed of wireless communication and, more particularly, to Multi-Input-Multi-Output (MIMO) and/or Single-Input-Multi-Output (SIMO) wireless communication.

BACKGROUND

Wireless communication has rapidly evolved over the past decades. Even today, when high performance and high bandwidth wireless communication equipment is made available there is demand for even higher performance at a higher bandwidth.

In a Multi-Output (MO) system, e.g., a Multi-Input-Multi-Output (MIMO) system or a Single-Input-Multi-Output (SIMO) system, may be subject to time-varying multi-path fading, in which a transmitted signal propagates along multiple paths to a receiver causing fading of the received signal. There are several techniques for reducing the Multi-path fading, such as time interleaving with error correction coding, implementation of frequency diversity by use of spread spectrum techniques, transmitter power control techniques, receiving antenna diversity, transmitting antenna diversity, or combinations thereof. Each technique has its own advantages and disadvantages.

Adaptive beamforming may be applied to a signal, which is transmitted via a plurality of transmit antennas, and/or to a transmission, which is received via a plurality of receive antennas. The adaptive beamforming includes applying a complex valued vector, including a plurality of weights, to the transmitted and/or received signals in order, for example, to create an equivalent directional antenna, at the direction of a desirable user.

In transmit (Tx) beamforming, the vector of weights may include a number of weights corresponding to the number of the transmit antennas. The plurality of weights may be applied to signals transmitted via the plurality of transmit antennas, respectively, in order, for example, to maximize a Signal-to-Noise-and-Interference-Ratio (SINR) at the receiver.

In receive (Rx) beamforming, the vector of weights may include a number of weights corresponding to the number of the receive antennas. The plurality of weights may be applied to signals received via the plurality of receive antennas, respectively, in order, for example, to maximize the SINR of one or more certain users.

In some Orthogonal Frequency-Division Multiplexing (OFDM) communication systems a pre-Fast-Fourier-Transform (FFT) beamforming scheme may be utilized. The pre-FFT beamforming scheme may include applying the plurality of weights to signals in the time domain, thereby creating constant weighting in the frequency domain. The pre-FFT scheme may be applicable, for example, when a coherence bandwidth of a communication channel is relatively large, such that the communication channel may be assumed nearly constant in the communication system bandwidth. Such assumption may not be applicable, for example, to multipath channels.

In other OFDM communication systems, a post-FFT beamforming scheme may be implemented. The post-FFT beamforming scheme may include applying the plurality of weights to signals in the frequency domain, such that different weights are applied in different frequency bands. The size of the frequency bands is usually determined based on the coherence bandwidth of the communication channel.

SUMMARY

Some embodiments include a wireless communication system including a receiver to process a wireless transmission received via a plurality of receive antennas. The receiver may include a joint beamforming-synchronization module to jointly determine, based on a plurality of training signals, both a synchronization-error value and a beamforming weight vector. The synchronization-error value represents a synchronization error corresponding to the wireless transmission, and the beamforming weight vector includes a plurality of weights to be applied to signals of the wireless transmission received via the plurality of antennas, respectively.

In some embodiments, the joint beamforming-synchronization module is to jointly determine the synchronization-error value and the beamforming weight vector based on a solution of a predefined optimization criterion relating to both the synchronization-error value and the beamforming weight vector.

In some embodiments, the optimization criterion includes minimizing a sum of a plurality of difference values corresponding to the plurality of training signals, respectively. Each difference value may include a difference between a result value, which results from applying to a training signal a weight corresponding to the training signal, and a synchronization-error factor representing the synchronization-error of the training signal, and between an expected predefined value of the training signal.

In some embodiments, the joint beamforming-synchronization module is to determine the solution of the optimization criterion by applying a recursive estimation filter to the optimization criterion.

In some embodiments, the recursive estimation filter includes an extended Kalman filter.

In some embodiments, the receiver includes a beamformer to apply the beamforming weight vector to the signals of the wireless transmission.

In some embodiments, the receiver includes an extractor to extract the training signals from the wireless transmission.

In some embodiments, the receiver includes a feedback module to output the temporal offset value.

In some embodiments, the training signals include a training sequence.

In some embodiments, the training signals include pilot symbols.

In some embodiments, the system may include the plurality of antennas to receive the wireless transmission.

Some embodiments include a method of wireless communication, the method including receiving a wireless transmission via a plurality of receive antennas; and jointly determining, based on a plurality of training signals, both a synchronization-error value and a beamforming weight vector. The synchronization-error value may represent a synchronization error corresponding to the wireless transmission, and the beamforming weight vector may include a plurality of weights to be applied to signals of the wireless transmission received via the plurality of antennas, respectively.

In some embodiments, the method may include jointly determining the synchronization-error value and the beamforming weight vector based on a solution of a predefined optimization criterion relating to both the synchronization-error value and the beamforming weight vector.

In some embodiments, the optimization criterion includes minimizing a sum of a plurality of difference values corresponding to the plurality of training signals, respectively, wherein each difference value includes a difference between a result value, which results from applying to a training signal a weight corresponding to the training signal, and a synchronization-error factor representing the synchronization-error of the training signal, and between an expected predefined value of the training signal.

In some embodiments, the method may include determining the solution of the optimization criterion by applying a recursive estimation filter to the optimization criterion.

In some embodiments, the recursive estimation filter includes an extended Kalman filter.

In some embodiments, the method may include applying the beamforming weight vector to the signals of the wireless transmission.

In some embodiments, the method may include extracting the training signals from the wireless transmission.

In some embodiments, the method may include outputting the temporal offset value.

In some embodiments, the training signals may include pilot symbols.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Moreover, some of the blocks depicted in the drawings may be combined into a single function. The figures are listed below.

DETAILED DESCRIPTION

Figure 1:
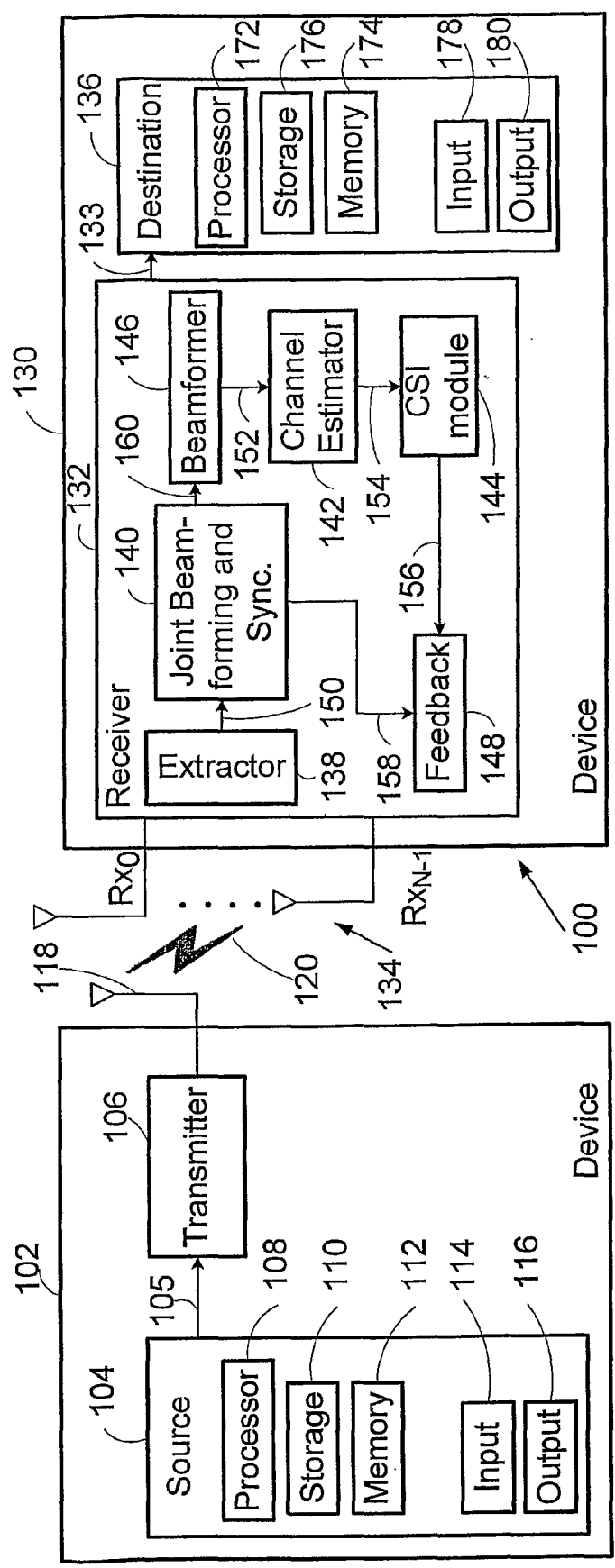
FIG. 1 is a schematic illustration of a wireless communication system, in accordance with some embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the to techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments may be used in conjunction with one or more types of wireless communication signals and/or systems, for example, Radio Frequency (RF), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Global System for Mobile communication (GSM), 2G, 2.5G, 3G, 3.5G, or the like. Some embodiments may be used in various other devices, systems and/or networks.

Some embodiments are described herein with reference to OFDM communication. However, other embodiments may be implemented with respect to any other suitable modulation and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a wired or wireless handheld device (e.g., BlackBerry, Palm Treo), a Wireless Application Protocol (WAP) device, or the like. Types of WLAN and/or WMAN communication systems intended to be within the scope of some embodiments include, although are not limited to, WLAN and/or WMAN communication systems as described by "IEEE-Std 802.16, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands" ("the 802.16e standard"), and the like, and/or future versions and/or derivatives and/or Long Term Evolution (LTE) of the above standards.

Reference is made to FIG. 1, which schematically illustrates a wireless communication system 100, in accordance with some demonstrative embodiments.

In some demonstrative embodiments, system 100 may include a wireless transmitter 106 capable of performing wireless communications, over a wireless communication channel, with a wireless receiver 132, e.g., as described in detail below.

In some embodiments, wireless transmitter 106 may transmit a wireless transmission 120 via one or more transmit antennas 118. Receiver 132 may receive transmission 120 via a plurality of receive antennas 134. In some embodiments, transmitter 106 and/or receiver 132 may be implemented as part of a Medium Access Control (MAC) layer, a physical (PHY) layer, and/or any other suitable communication layer or configuration.

In one embodiment, wireless transmission 120 may include a MIMO transmission, e.g., if antennas 118 include a plurality of transmit antennas. In another embodiment, wireless transmission 120 may include a SIMO transmission, e.g., if antennas 118 include a single transmit antenna. Wireless transmission 120 may include any suitable RF signals, blocks, frames, transmission streams, packets, video frames, control signals, messages and/or data.

In some demonstrative embodiments, transmitter 106 may generate transmission 120 based on data signals 105, which may be received from a source module 104. Receiver 132 may decode transmission 120 to generate signals 133, e.g., corresponding to signals 105, which may be provided to a destination module 136. Signals 105 may include any suitable data and/or information.

In some embodiments, source module 104 and transmitter 106 may be implemented as part of a device 102; and/or destination module 136 and receiver 132 may be implemented as part of a device 130.

In some demonstrative embodiments, devices 102 and/or 130 may include any suitable portable device and/or non-portable device. In one example, devices 102 and/or 130 may include, may be, or may perform the functionality of a mobile device, e.g., a laptop, a Personal Digital Assistants (PDA), a handheld computer, a notebook computer, a portable game console, a Voice-Over-Internet-Protocol (VoIP) phone, a portable video device, a portable computer, a portable audio device, a media player, and the like. In another example, devices 102 and/or 130 may include, may be, or may perform the functionality of a non-portable device, e.g., a desktop computer, a non-portable computer, a workstation, a non-portable video device, a non-portable audio device, a Set-Top-Box (STB), a non-portable game console, a PC, a non-portable media player, a non-portable video player, and the like. In one embodiment, for example, device 130 may include or may be a Base Station (BS); and/or device 102 may include or may be a User Terminal (UT).

In some demonstrative embodiments, device 102 and/or source 104 may include a processor 108, a storage 110, a memory 112, an input 114, an output 116 and/or any other suitable hardware components and/or software components. Device 130 and/or destination 136 may include a processor 172, a storage 176, a memory 174, an input 178, an output 180 and/or any other suitable hardware components and/or software components. In some embodiments, signals 105 may be generated by processor 108 and/or stored by memory 112 and/or storage 110. Signals 133 may be processed by processor 172 and/or stored by memory 174 and/or storage 176.

Processors 108 and/or 172 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), and/or any other suitable multi-purpose or specific processor or controller. Storages 110 and/or 176 include, for example, a hard disk drive, a floppy disk drive, a Compact Disk (CD) drive, a CD-ROM drive, a DVD drive, and/or any other suitable removable or non-removable storage units. Memories 112 and/or 174 include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, and/or one other suitable memory unit. Inputs 114 and/or 178 include, for example, a keyboard, a keypad, a mouse, a touch-pad, a track-ball, a stylus, a microphone, and/or any other suitable pointing device or input device. Outputs 116 and/or 180 include, for example, a monitor, a screen, a Cathode Ray Tube (CRT) display unit, a Liquid Crystal Display (LCD) display unit, a plasma display unit, one or more audio speakers, and/or any other suitable output device.

In some demonstrative embodiments, some or all of the components of devices 102 and/or 130 may be enclosed in a common housing, packaging, or the like, and may be interconnected or operably associated using one or more wired or wireless links. In other embodiments, components of devices 102 and/or 130 may be distributed among multiple or separate devices.

In some embodiments, types of antennae that may be used for antennas 118 and/or 134 may include but are not limited to internal antenna, dipole antenna, omni-directional antenna, a monopole antenna, an end fed antenna, a circularly polarized antenna, a micro-strip antenna, a diversity antenna and the like.

In some embodiments, receiver 132 may include a beamforming receiver capable of handling wireless transmission 134 according to a beamforming scheme, e.g., as described below.

In some embodiments, receiver 132 may include a joint beamforming-synchronization module 140 to jointly determine, based on a plurality of training signals 150, both a synchronization-error value 158 and a beamforming weight vector 160, e.g., as described in detail below. Synchronization-error value 158 may represent a time-synchronization (also referred to as "temporal synchronization") error and/or a frequency-synchronization error corresponding to the transmission of wireless transmission 120 between transmitter 106 and receiver 132. Beamforming weight vector 160 may include a plurality of weights to be applied, e.g., according to a suitable beamforming scheme, to signals of wireless transmission 120, which are received via the plurality of antennas 134, respectively. For example, the number of weights in weight vector 160 may be equal to the number of antennas 134.

Although some embodiments are described herein with reference to determining a synchronization error value, e.g., synchronization error value 158, including a time-synchronization error in the time domain, it will be appreciated that other embodiments may be similarly implemented to determine the synchronization error value, e.g., synchronization error value 158, including a frequency-synchronization error in the frequency domain.

In some embodiments, receiver 132 may include an extractor 138 to determine ("extract") training signals 150 from wireless transmission 120. In one embodiment, training signals 150 include a training sequence. For example, training signals 150 may include a plurality of pilot symbols, e.g., as described below. In other embodiments, training signals 150 may include any other suitable training signals, symbols, and the like.

In some embodiments, joint beamforming-synchronization module 140 may jointly determine synchronization-error value 158 and beamforming weight vector 160 based on a solution of a predefined optimization criterion relating to both the synchronization-error value 158 and the beamforming weight vector 160.

In some embodiments, the optimization criterion may include minimizing a sum of a plurality of difference values corresponding to the plurality of training signals 150, respectively. For example, each difference value may include a difference between a determined training signal value and between an expected, predefined, value of a training signal of signals 150. The determined training signal value may include a value resulting from applying to the training signal of signals 150 a weight corresponding to the training signal 150 and a synchronization-error factor representing the synchronization-error of the training signal 150, e.g., as described in detail below.

In some embodiments, joint beamforming-synchronization module 140 may determine the solution of the optimization criterion by applying a recursive estimation filter to the optimization criterion. For example, the recursive estimation filter may include an Extended Kalman Filter (EKF), e.g., as described in detail below.

In some embodiments, receiver 132 may also include a beamformer 146 to generate a beamformed frequency domain signal 152 by applying beamforming weight vector 160 to the signals of the wireless transmission 120, e.g., as described below.

In some embodiments, receiver 132 may include a feedback module 148 to output synchronization-error value 158, e.g., in the form of a synchronization-error message. In one embodiment, feedback module 148 may include a suitable transmitter capable of transmitting a feedback transmission including information representing synchronization-error value 158 back to device 102 and/or transmitter 106. The feedback transmission may include any suitable transmission, e.g., a wireless transmission or a wired transmission. Transmitter 106 may include any suitable synchronization mechanism to synchronize transmission 120 based on the feedback of synchronization-error value 158. In other embodiments, feedback module 148 may implement any other suitable mechanism and/or scheme to provide, directly or indirectly, information representing synchronization-error 158 back to device 102 and/or transmitter 106.

In one embodiment, for example, the estimated synchronization-error value 158 may be used as an enhanced-ranging mechanism. For example, if device 130 performs the functionality of a BS and device 102 performs the functionality of a UT, then device 130 may utilize the estimated synchronization-error value 158 to indicate to device 102 to change a temporal offset at transmission, e.g., according to a suitable ranging mechanism. As a result, the performance of transmission 120 may be increased, e.g., as a whole. In other embodiments, receiver 132 and/or transmitter 106 may utilize the estimated synchronization-error value 158 according to any other suitable method, algorithm, scheme and/or mechanism.

In some embodiments, receiver 132 may include a channel estimator 142 to estimate a channel response 154, e.g., in the form of a channel matrix, corresponding to communication channels between transmit antennas 118 and receive antennas 134. For example, channel estimator 142 may estimate channel response 154 based on beamformed frequency domain signal 152, e.g., as described below.

In some embodiments, communication between a transmitter, e.g., transmitter 106, and a receiver, e.g., receiver 132, may be sensitive to a synchronization-error. For example, the synchronization error may increase a coherence bandwidth of the communication channels between the transmitter and receiver. Accordingly, large synchronization errors may result in a decrease of the coherence bandwidth of at least one of the communication channels, e.g., below a width of the frequency band of the communication channel, which in turn may result in degradation of the beamforming performance. The transmitter and/or receiver may be configured to operate at relatively low SINR. Such low SINR may be, for example, far below an SINR range, in which the time-synchronization mechanisms implemented by the receiver may operate efficiently without utilizing the beamforming mechanism. As a result, a time-synchronization mechanism for synchronizing between the transmitter and receiver may be the "weakest link", which may severely limit the performance of the communication system.

In some embodiments, joint beamforming and synchronization module 140 may be configured to jointly estimate both the beamforming weights and the synchronization-error corresponding to transmission 120, e.g., as described herein. Accordingly, a time-synchronization mechanism utilized by transmitter 106 and/or receiver 132 may not limit the performance of beamformer 146, thereby enabling system 100 to operate, e.g., even at significantly low SINR values.

In some embodiments, signals of transmission 120 received by receiver 132 may be represented, e.g., on an OFDM subcarrier level, as follows:

$$y_k = h_k x_k + \sum_i h_k(i) c_k(i) + \rho n, \quad (1)$$

wherein $y_k$ denotes a received vector signal, e.g., of size N×1, in a k-th symbol, wherein N denotes the number of receive antennas 134; $x_k$ denotes a corresponding signal of transmission 120 corresponding to the k-th symbol, as transmitted by transmitter 118; $h_k$ denotes a channels vector corresponding to the k-th symbol from transmitter 106 to antennas 134; $c_k(i)$ denotes an i-th interference signal corresponding to the k-th symbol, wherein i=1 ... m<N; $h_k(i)$ denotes a channels vector corresponding to the k-th symbol from the i-th interference source to antennas 134; $\rho$ denotes receiver noise intensity; and n denotes a vector of Additive Gaussian White Noises (AWGN).

In some embodiments, the received signals $y_k$ may be multiplied by a complex valued weight vector, denoted $\hat{w}$, in order, for example, to maximize a post processing SINR value and/or minimize a predefined cost function, e.g., the function:

$$\sum_k |y_k^H \hat{w} - x_k|^2. \quad (2)$$

wherein $y_k^H$ denotes the conjugate transpose of $y_k$.

For example, beamformer 146 may multiply the received signals $y_k$ by the weight vector of signals 160, e.g., to determine the products $y_k * \hat{w}$. For example, beamformer 146 may apply the same weight vector $\hat{w}$ to all the k signals $y_k$ on the same OFDM Subcarrier.

One approach to constructing the weight vector $\hat{w}$, such that Function 2 is approximately minimized, may utilize a predefined set of known training signals, e.g., including known pilot subcarriers or a suitable training sequence, which may be transmitted by transmitter 106. For example, the weight vector $\hat{w}$ may be determined, for example, as follows:

$$\hat{w} = \underset{w}{\operatorname{argmin}} \sum_j |y_j^H w - p_j|^2, \quad (3)$$

wherein $p_j$ denotes a j-th pilot subcarrier; and $y_j$ denotes a received vector corresponding to the pilot $p_j$.

The optimization problem of Equation 3 may be rewritten, for example, as follows:

$$\hat{w} = \underset{w}{\operatorname{argmin}} |Hw - p|^2, \quad (4)$$

wherein H and p denote the following vectors:

$$H = \begin{bmatrix} y_1^H \\ \vdots \\ y_M^H \end{bmatrix}; \quad p = \begin{bmatrix} p_1 \\ \vdots \\ p_M \end{bmatrix},$$

and wherein M is the number of Pilot Subcarriers.

A Least Squares (LS) solution of the optimization problem of Equation 4 may be determined, e.g., as follows:

$$\hat{w} = (H^H H)^{-1} H^H p. \quad (5)$$

wherein $H^H$ denotes the conjugate transpose of H

The LS solution of Equation 5 may require determining an inversion of the matrix $H^H H$, which may be relatively large. Optionally, the following Recursive Least Squares (RLS) solution of the optimization problem of Equation 4 may be determined as follows, e.g., using the Kalman filter solution:

$$k_n = P_n^- y_n [y_n^H P_n^- y_n + r]^{-1}$$

$$\hat{w}_n = \hat{w}_{n-1} + k_n [p_n - y_n^H \hat{w}_{n-1}]$$

$$P_{n+1}^- = [I - k_n y_n^H] P_n^-, \quad (6)$$

wherein r denotes a noise covariance parameter determining the rate of convergence of the Kalman solution.

It is noted, that the final weight vector $\hat{w}$ is approximated, for example, by $\hat{w}_M$.

The above-described approach for constructing the weight vector $\hat{w}$ may not be efficient and/or practical in some communication systems since, for example, such approach may require the transmission of a relatively large number of pilots at each subcarrier. Therefore, the pilots may be transmitted only in frequency bands that are smaller than the coherence bandwidth of the channel, e.g., according to the Band AMC and/or PUSC without subchannel rotation uplink transmission schemes as are defined by the IEEE802.16e standard, the Single-Carrier Frequency-Division-Multiple-Access (SC-FDMA) transmission scheme as defined by the Third Generation Partnership Project (3GPP) LTE, and the like.

The performance of a beamformer utilizing the weight vector $\hat{w}$ may depend on the performance of a time-synchronization mechanism utilized by transmitter 106 and/or receiver 132, for example, if the weight vector $\hat{w}$ is constructed based on the pilots within a certain frequency band. For example, synchronization errors may significantly increase a delay spread of the effective channel, and thus decrease the coherence bandwidth to a point where, for example, the coherence bandwidth is lesser than the size of the frequency band. Accordingly, determining the temporal offset separately from determining the weight vector $\hat{w}$, for example, by achieving temporal synchronization before determining the weight vector $\hat{w}$, or by determining the weight vector $\hat{w}$ prior to achieving temporal synchronization, may not be efficient.

In some embodiments, joint beamforming and synchronization module 140 may be configured to jointly estimate the beamforming weight vector $\hat{w}$ and the synchronization-error value, e.g., as described in detail below. According to these embodiments, the performance of beamformer 146 may not be substantially affected and/or limited by the performance of a time-synchronization mechanism implemented by system 100.

In some embodiments, the synchronization error may cause a linear phase in the frequency domain. Thus, for example, a subcarrier in the signal received by receiver 132 may be rotated by a rotation factor. For example, in OFDM, the k-th subcarrier in the signal received by receiver 132 may be rotated by the rotation factor of $$\exp\left(-i \frac{2\pi}{N_{FFT}} k \Delta t\right),$$

wherein $\Delta t$ denotes the time-synchronization error, e.g., measured in terms of samples.

In some embodiments, joint beamforming and synchronization module 140 may jointly determine the values of both the time-synchronization error $\Delta t$ and the weight vector $\hat{w}$, by solving for example, the following optimization criterion, which relates to both the time-synchronization error $\Delta t$ and the beamforming weight vector $\hat{w}$:

$$\hat{w}, \Delta\hat{t} = \underset{w, \Delta t}{\operatorname{argmin}} \sum_j \left| \exp\left(i\frac{2\pi}{N_{FFT}} k_j \Delta t\right) y_j^H w - p_j \right|^2. \quad (7)$$

wherein $k_j$ denotes the frequency-symbol location of the j-th pilot.

The solution of the optimization criterion of Equation 7 may be nonlinear. In some embodiments, module 140 may implement a suitable Extended Kalman filter (EKF) to determine the solution of the optimization criterion of Equation 7, e.g., as follows:

$$k_n = P_n^- h_n [h_n^H P_n^- h_n + r]^{-1} \quad (8)$$

$$\begin{bmatrix} \hat{w}_n \\ \Delta\hat{t}_n \end{bmatrix} = \begin{bmatrix} \hat{w}_{n-1} \\ \Delta\hat{t}_{n-1} \end{bmatrix} + k_n \left[ \tilde{p}_n - h_n^H \begin{bmatrix} \hat{w}_{n-1} \\ \Delta\hat{t}_{n-1} \end{bmatrix} \right]$$

$$P_{n+1}^- = [I - k_n h_n^H] P_n^-,$$

wherein:

$$\tilde{p}_n = p_n + i\frac{2\pi}{N_{FFT}} k_n \exp\left(\frac{2\pi}{N_{FFT}} k_n \Delta\hat{t}_{n-1}\right) y_n^H \hat{w}_{n-1} \Delta\hat{t}_{n-1}$$

$$h_n^H = \exp\left(\frac{2\pi}{N_{FFT}} k_n \Delta\hat{t}_{n-1}\right) \left[y_n^H i \frac{2\pi}{N_{FFT}} k_n \hat{w}_{n-1}\right].$$

In some embodiments, module 140 may jointly estimate the weights vector $\hat{w}=\hat{w}_M$ and the temporal offset estimate $\Delta\hat{t}=\Delta\hat{t}_M$ based on the recursive solution Equation set 8. In one non-limiting example, the initial values of $P_0^-=\sigma \cdot I$ and $\hat{w}=0$, $\Delta\hat{t}_M=0$ may be chosen, wherein and $\sigma$ denotes a large constant, relative to r. In other embodiments, in other suitable initial values may be selected.

In some embodiments, recursive-solution Equation set 8 may be viewed as a scheme incorporating a Recursive-Least-Squares (RLS) beamforming algorithm combined with a phase-locked-loop (PLL). Since the optimization Criterion 7 is nonlinear, the convergence of the solution according to Equation set 8 with optimization Criterion 7 may not be guaranteed. However, the solution of Equation set 8 may converge to a relatively close neighborhood of the optimization Criterion 7, e.g., with extremely high probability, for example, in the case of bands, which are small enough, for example, according to the Band AMC and/or PUSC without Subchannel rotation uplink transmission schemes as are defined by the IEEE802.16e standard, the SC-FDMA transmission scheme as defined by the 3GPP LTE, and the like.

In some embodiments, the convergence of the solution according to Equation set 8 with optimization Criterion 7 may be verified, for example, by evaluating the norm $$\sum_j \left| \exp\left(i\frac{2\pi}{N_{FFT}} k_j \Delta t\right) y_j^H w - p_j \right|^2,$$

and comparing the evaluated norm to a threshold value, Threshold=f(SNR), which may be defined based on the SINR of system 100. The solution according to Equation 8 may be determined to converge with optimization Criterion 7, for example, if the evaluated norm is equal to or less than the threshold value.

Figure 2:
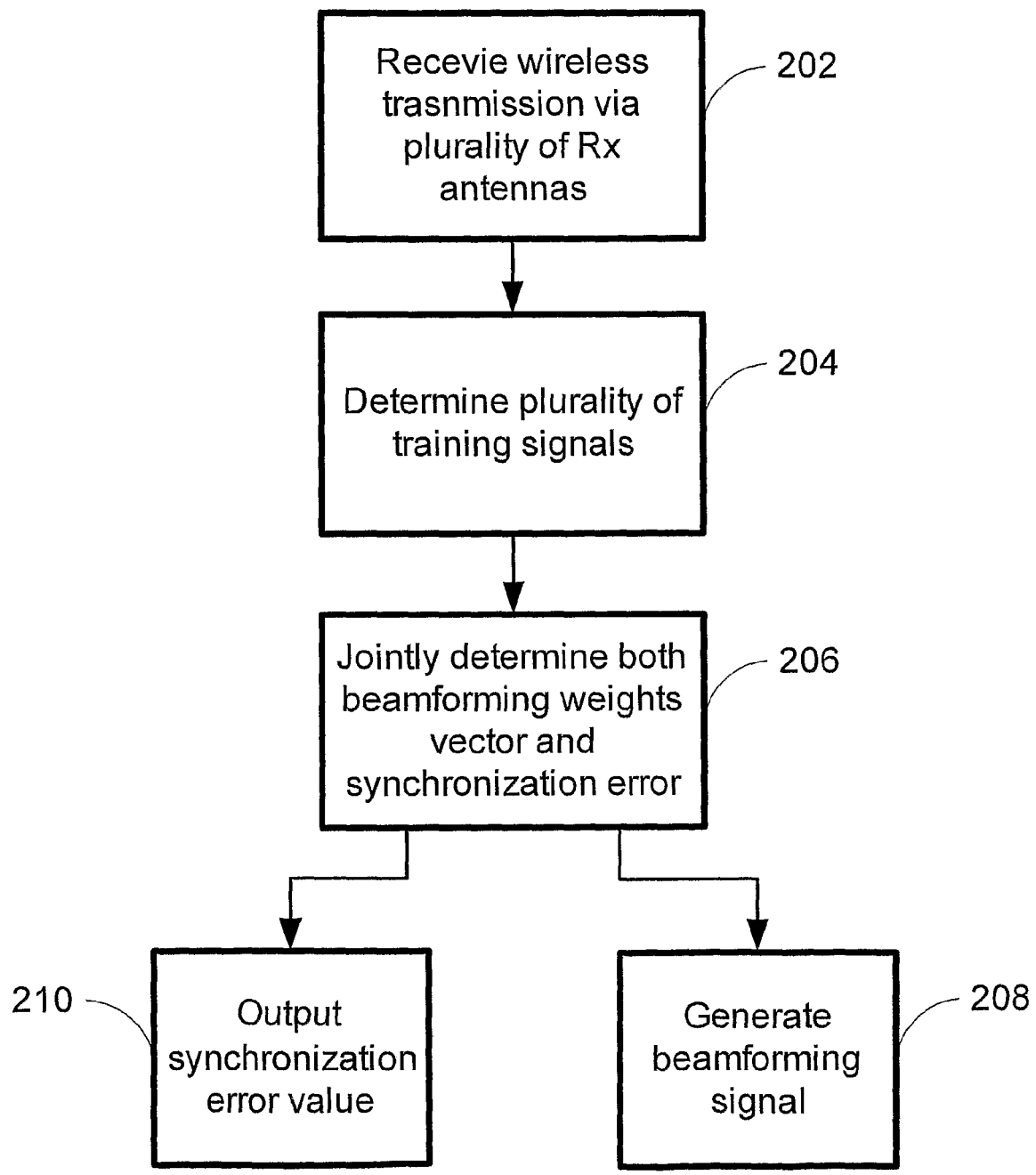
FIG. 2 is a schematic flow-chart illustration of a method of processing a received wireless transmission, in accordance with some demonstrative embodiments.

Reference is now made to FIG. 2, which schematically illustrates a method of processing a received wireless transmission, in accordance with some demonstrative embodiments. In one embodiment, one or more operations of the method of FIG. 2 may be performed by receiver 132 (FIG. 1).

As indicated at block 202, the method may include receiving a wireless transmission via a plurality of antennas. For example, receiver 132 (FIG. 1) may receive transmission 120 (FIG. 1) via antennas 134 (FIG. 1), e.g., as described above.

As indicated at block 204, the method may include determining a plurality of training signals based on the received transmission. For example, extractor 138 (FIG. 1) may extract training signals 150 (FIG. 1), e.g., as described above.

As indicated at block 206, the method may include jointly determining both the beamforming weights vector and a synchronization-error value based on the training signals. For example, module 140 (FIG. 1) may jointly determine beamforming weights vector 160 (FIG. 1) and synchronization-error value 158 (FIG. 1) based on training signals 150 (FIG. 1), e.g., as described above.

As indicated at block 208, the method may include generating a beamformed frequency domain signal by applying the beamforming weight vector to the received signals of the wireless transmission. For example, beamformer 146 (FIG. 1) may generate beamformed frequency domain signal 152 (FIG. 1) by applying beamforming weight vector 160 (FIG. 1) to the signals of the wireless transmission 120 (FIG. 1), e.g., as described above.

As indicated at block 210, the method may also include outputting the synchronization-error value back to the transmitter. For example, feedback module 148 (FIG. 1) may output synchronization-error value 158 (FIG. 1), e.g., described above.

In some embodiments, processing the received wireless transmission according to the operations of method 2 may enable jointly converging to the beamforming weight vector and the temporal offset value, e.g., within a single iteration. This single-iteration convergence may be in contrast to the convergence of some conventional algorithms, in which several iterations may be performed with respect to determining the beamforming weights vector and/or the timing synchronization. For example, one conventional algorithm may include assuming a certain timing, determining the beamforming weights based on the assumed timing, e.g., according to optimization problem of Equation 3, and iteratively repeating the assumption of the timing and the determination of the beamforming weights. Another conventional algorithm may include determining the beamforming weights, performing time-synchronization, and iteratively repeating the determination of the beamforming weights and the time-synchronization. Accordingly, the single-iteration convergence, which may be achieved by the operations of the method of FIG. 2, may be much more efficient, e.g., by a factor of ten, with relation to the conventional algorithms, in terms of the time to convergence to the beamforming weights vector and the time-synchronization.

Figure 3:
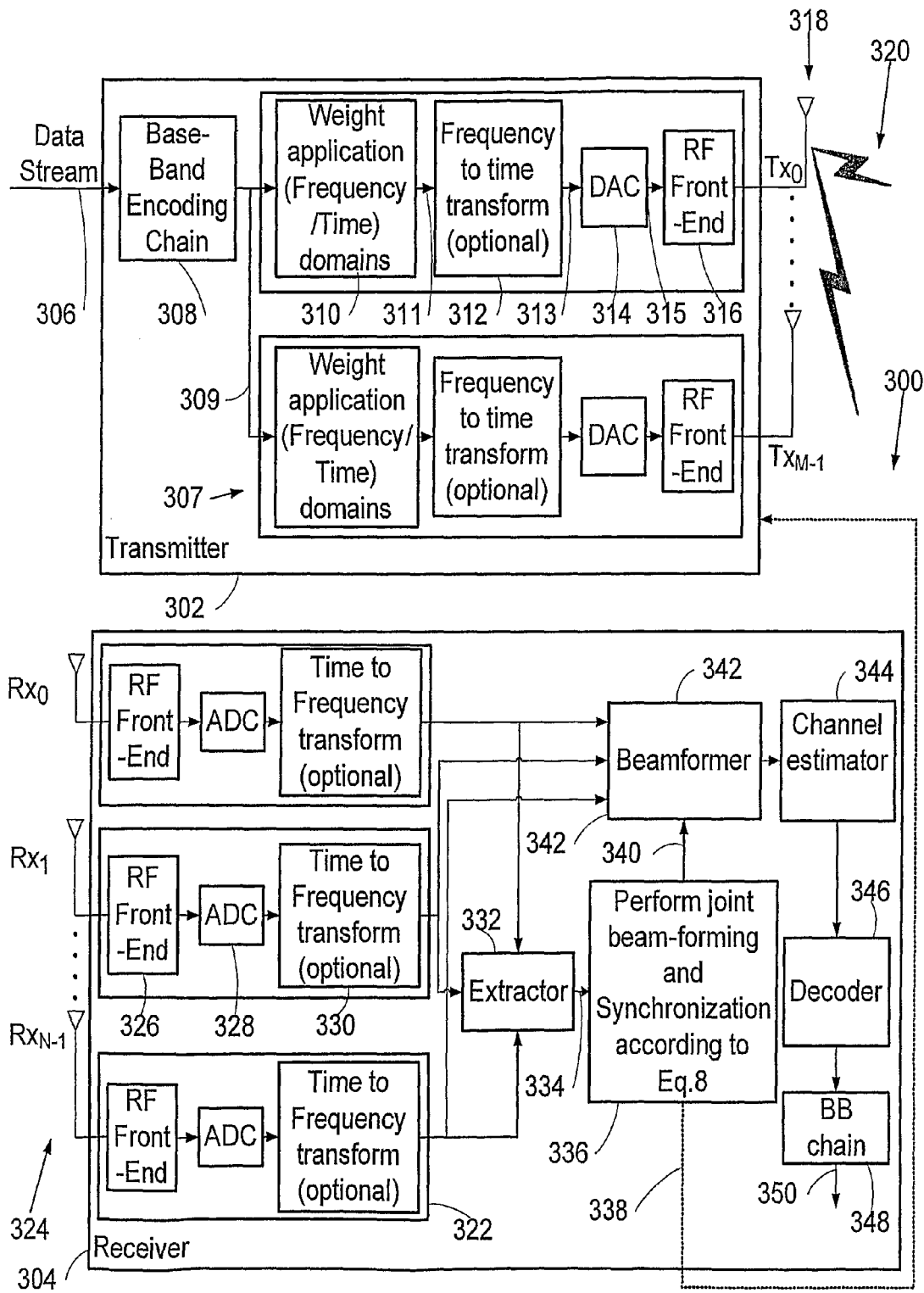
FIG. 3 is a schematic illustration of a Multi-Input-Multi-Output (MIMO) communication system, in accordance with some demonstrative embodiments.

Reference is made to FIG. 3, which schematically illustrates a MIMO communication system 300, including a transmitter 302 and a receiver 304, in accordance with some demonstrative embodiments. In one embodiment, transmitter 302 and/or receiver 304 may perform the functionality of transmitter 106 (FIG. 1) and/or receiver 132 (FIG. 1), respectively.

Transmitter 302 may include, for example, a plurality of Tx paths 307 to transmit data of an input stream 306, e.g., including signals 105 (FIG. 1), via a plurality of respective Tx antennas 318. Each of Tx paths 307 may include, for example, a base-band (BB) encoding chain 308, e.g., including any one or more suitable BB modules, to receive input data stream 306 and to output a digital modulated stream 309. Stream 309 may include, for example, data encoded according to any suitable encoding scheme, e.g., a Forward Error Correction (FEC) scheme, and/or mapped according to any suitable constellation scheme, e.g., the Binary Phase Shift Keying (BPSK) scheme, the Quaternary Phase-Shift Keying (QPSK) scheme, the 16-Quadrature-Amplitude-Modulation (16QAM) scheme, the 64QAM scheme, and the like. Each Tx path may also include a Tx beamforming module 310 to apply a suitable Tx beamforming weight vector to the signals of stream 309, and thereby generate a stream 311. Each Tx path 307 may optionally include a frequency-to-time-domain transform module 312 to convert the signals of stream 311 into a stream 313 in the time domain, e.g., using an Inverse Fast Fourier Transform (IFFT). Module 312 may optionally add a Cyclic-prefix/Guard-Interval (CP/GI). Each Tx path 307 may also include a Digital-to-Analog Converter (DAC) module 314 to convert the digital signals of stream 313 into an analog domain. Each Tx path 307 may also include Radio-Frequency (RF) front-end 316 to convert analog signals 315 from module 314, which may be modulated at BB frequency or any other frequency, into signals in a desired RF band. Tx paths 307 may be associated with antennas 318, respectively, to transmit the RF signals to receiver 304, e.g., as part of a MIMO transmission 320.

In some embodiments, receiver 304 may include a plurality of Rx paths 322 to receive transmission 320 via a plurality of respective Rx antennas 324. Each of Rx paths 322 may include, for example, a RF front end 326 to convert an analog signal received via a respective Rx antenna 324 into a suitable frequency, e.g., a BB frequency or any other frequency; an Analog-to-Digital-Converter (ADC) module 328 to convert the analog signal into the digital domain; and a time to frequency domain transform module 330 to convert the received signal from the time domain to the frequency domain, e.g., by performing a Fast Fourier Transform (FFT), and optionally to remove the CP/GI.

In some embodiments, receiver 304 may also include an extractor 332 to extract from the signals received from Rx paths 322 a plurality of training signals 334. For example, extractor 332 may perform the functionality of extractor 138 (FIG. 1). For example, training signals 334 may include pilot signals of different sub-carriers in the frequency domain; and/or pilot symbols in the time domain.

In some embodiments, receiver 304 may also include a joint beamforming and synchronization error module 336 to jointly determine a beamforming weights vector 340 and a synchronization error value 338 based on training signals 334. For example, module 336 may perform the functionality of module 140 (FIG. 1). The synchronization error value 338 may be provided back to transmitter 302 using any suitable feedback mechanism, e.g., as described above with reference to feedback module 148 (FIG. 1).

In some embodiments, receiver 304 may also include an Rx beamformer module 342 apply beamforming weights vector 340 to the signals received via Rx paths 322. For example, module 342 may perform the functionality of module 146 (FIG. 1).

In some embodiments, receiver 304 may also include a channel estimator 344 to determine a channel response based on the output of beamformer 342; a decoder 346 to decode the beamformed signals from beamformer 342 based on the channel response determined by channel estimator 344, e.g., by determining a stream of soft decisions; and/or a BB decoding chain 348 of one or more BB modules to output a data stream 350, e.g., including signals 133 (FIG. 1), based on the decoded stream.

Referring back to FIG. 1, in some embodiments, system 100 may be capable of performing Closed Loop (CL) MIMO communication. For example, receiver 132 may be capable of providing to transmitter 106 channel state information (CSI), which may be used, for example, to enhance the MIMO link, e.g., to allow higher link capacity and/or higher throughout.

In some embodiments, receiver 132 may include a CSI module 144 to determine CSI feedback data 156 corresponding to the communication channels between transmit antennas 118 and receive antennas 134. CSI module 144 may determine CSI feedback data 156 based, for example, on channel response 154, e.g., as described below.

In some embodiments, CSI feedback data 156 may include data representing a beamforming Eigen vector. For example, CSI feedback data 156 may include a plurality of bits representing an entry in a predefined codebook corresponding to the beamforming Eigen vector, e.g., as described below.

In some embodiments, CSI feedback data 156 may be provided back to transmitter 106, e.g., by feedback module 148 and/or by any other suitable feedback module and/or mechanism.

In some embodiments, CSI module 144 may implement a low-complexity algorithm to determine CSI feedback data 156, for example, without computing a Singular Value Decomposition (SVD) of the channels matrix, e.g., as described in detail below.

In some embodiments, transmission 120 as received by receiver 132 via antennas 134 may be represented as follows, e.g., in analogy to Equation 1 without directly relating to the fading effect:

$$y = Hx + \rho n, \tag{9}$$

wherein y denotes the received signal vector, x denotes the transmitted signal vector, H denotes the channels matrix, $\rho$ denotes the receiver noise intensity, and n denotes the vector of AWGN.

If CL-MIMO communication is performed between receiver 132 and transmitter 106, then receiver 132 may send information regarding a matrix V to transmitter 106. The matrix V may satisfy the SVD of the channel matrix H as follows:

$$H = UDV^H, \tag{10}$$

wherein U and V denote unitary matrices, D denotes a diagonal matrix with real positive entries in descending order, and the notation $\{\cdot\}^H$ denotes conjugate transposition.

When performing CL-MIMO transmission, transmitter 106 may pre-code the to transmitted vector x by the matrix V, and transmit the pre-coded (beamformed) signal Vx. Accordingly, the signal received by receiver 132 may be represented as follows:

$$y = HVx + \rho n. \tag{11}$$

Receiver 132 may perform CL-MIMO decoding by multiplying the received signal y with the matrix $U^H$.

Accordingly, a resulting decoded signal, denoted z, may be represented as follows:

$$z = U^H y = U^H HVx + U^H \rho n, \tag{12}$$

Equation 12 may be rewritten as follows, e.g., using the properties of the SVD of Equation 10, and the fact that U is unitary:

$$z = Dx + \rho\tilde{n}, \quad (13)$$

wherein ñ denotes another vector of AWGN.

Thus, the utilization of the CL-MIMO transmission may enable representing the MIMO channel by a set of independent single input single output (SISO) channels.

However, in many cases, especially when the correlation between the spatial channels is high, the elements on the diagonal of the matrix D may be significantly different from each other, and the transmission of multiple streams may not be efficient. In this case (also known as "Eigen-Beamforming"), a single stream x may be transmitted by transmitter 106, wherein the stream x is beamformed with the Eigen vector v of the matrix V, which corresponds to the largest Eigen value of the matrix D. Receiver 132 may decode the received signals using the column vector u corresponding to the beamformer vector v.

In some embodiments, receiver 132 may transmit to transmitter 106 a quantized version of the beamforming vector v, for example, instead of transmitting the whole beamforming vector v, which may not be efficient. For example, feedback module 148 may transmit the quantized or redacted representation of the beamforming vector v via a suitable feedback channel from receiver 132 to transmitter 106.

In some embodiments, the redacted representation of the beamforming vector v may be in the form of an l-bit value representing an entry in a predefined codebook, for example, having $2^l$ predefined entries, e.g., in accordance with the 802.16 standard.

In some conventional CL-MIMO algorithm, a receiver may estimate the channel matrix H; compute the SVD of the matrix H; select a vector $\hat{v}$ out of the $2^l$ predefined vectors in the predefined codebook to represent the computed vector v; and feedback l bits representing the location of the vector $\hat{v}$ in the codebook. In many cases, the computation of the SVD of the matrix H may be the most computationally costly operation in the conventional CL-MIMO algorithm. The SVD becomes more difficult to compute as the dimensions of H increase.

In some embodiments, receiver 132 may determine the CSI data 156 including the l-bit feedback value without, for example, performing one or more operations, e.g., all operations, of the above-discussed SVD computation, e.g., as described in detail below.

As discussed above, in the conventional CL-MIMO algorithm, the selection of the vector $\hat{v}$ is performed after, and based on the computation of the SVD and the computation of the optimal beamformer v. In contrast to this algorithm, in some embodiments, the selection of the vector $\hat{v}$ is performed based on an optimization criterion, which the optimal vector v is to satisfy, e.g., without performing the computation of the SVD.

In some embodiments, the optimization criterion is set to require the optimal beamformer v to maximize the Signal to Noise Ratio (SNR) at receiver 132. For example, the optimization criterion may be represented as follows:

$$\hat{v} = \underset{\xi \in A}{\operatorname{argmin}} |H\xi|^2 \quad (14)$$

wherein A denotes a set of all complex valued vectors ξ such that $|\xi|^2 = 1$.

It is noted, that the solution to the optimization criterion of Equation 14 includes the Eigen vector of the matrix V corresponding to the largest Eigen value in the matrix D.

In some embodiments, the vector $\hat{v}$ satisfying the optimization criterion of Equation 14 is also required to be included in the set of $2^l$ predefined vectors of the predefined codebook. Accordingly, instead of first solving the optimization criterion of Equation 14 for the entire set A, and then selecting the most proper vector in the codebook, in some embodiments, the optimization problem of Equation 14 may be redefined, such the set over which the minimization is performed includes the set of vectors in the predefined codebook. For example, the optimization problem may be defined as follows:

$$\hat{v} = \underset{\xi \in Codebook}{\operatorname{argmin}} |H\xi|^2 \quad (15)$$

In some embodiments, CSI module 144 may determine CSI data 156 including the selected entry in the predefined codebook based, for example, directly on the optimization problem of Equation 15, e.g., without performing the SVD computation.

In some embodiments, CSI module 144 may receive channel response 154, e.g., from channel estimator 142. CSI module 144 may directly select a vector $\hat{v}$ out of the $2^l$ vectors in the predefined codebook, e.g., by solving the optimization criterion of Equation 15, for example, without performing one or more SVD computations, e.g., without performing any SVD computations.

In some embodiments, receiver 132 may apply a suitable decoding scheme to decode the received signals, for example, without using the column u of the matrix U. For example, receiver 132 may apply a suitable Maximal Ratio Combining (MRC) decoding scheme to the signals received via antennas 134.

The following table includes the number of computational operations required for a conventional CL-MIMO algorithm implementing the SVD computations to determine the vector $\hat{v}$, e.g., excluding the operation of selecting of the most appropriate weight vector out of the codebook:

TABLE 1

| Antenna configuration (number of Rx antennas and Tx antennas) | Normalization operations | Complex multiplications | Real multiplications |
|---|---|---|---|
| 2 × 2 | 20 | 35 | 124 |
| 4 × 2 | 45 | 240 | 124 |
| 4 × 4 | 112 | 486 | 2127 |
| 5 × 5 | 185 | 1178 | 5466 |

The following table includes the number of computational operations for determining the vector $\hat{v}$ based on the optimization criterion of Equation 15:

TABLE 2

| Antenna configuration (number of Rx antennas and Tx antennas) | Code-Book Options | Complex multiplications |
|---|---|---|
| 2 × 2 | 8 | 32 |
| 4 × 2 | 16 | 96 |

TABLE 2-continued

| Antenna configuration (number of Rx antennas and Tx antennas) | Code-Book Options | Complex multiplications |
| --- | --- | --- |
| 4 × 4 | 16 | 192 |
| 5 × 5 | 24 | 600 |

As clearly seen from a comparison of the numbers of Tables 1 and 2, a reduced number of computational operations and/or a reduced complexity of the computational operations may be achieved by implementing the optimization criterion of Equation 15 to determine the vector $\hat{v}$, in accordance with some embodiments.

Figure 4:
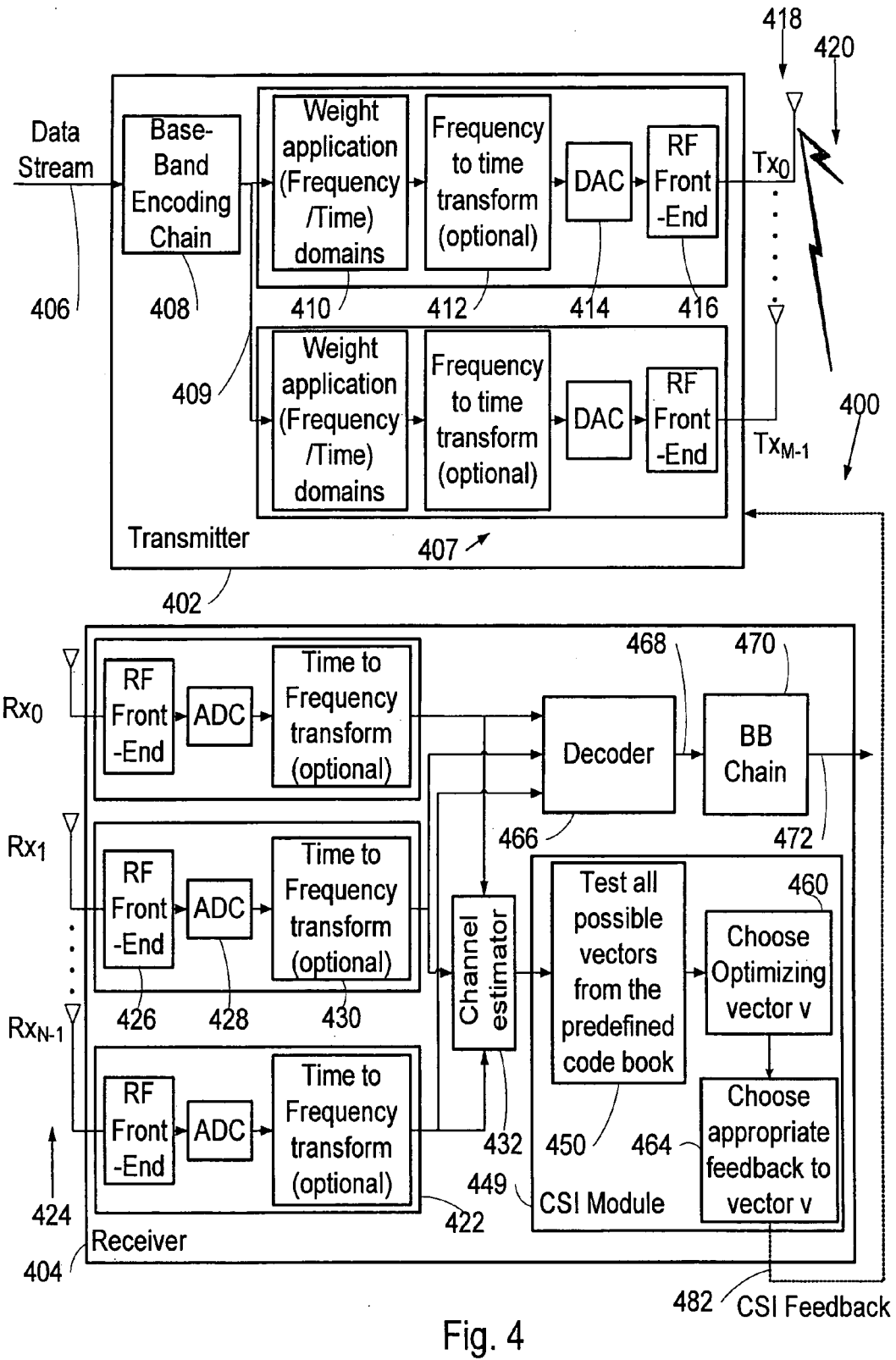
FIG. 4 is a schematic illustration of a MIMO communication system, in accordance with some demonstrative embodiments.

Reference is made to FIG. 4, which schematically illustrates a MIMO communication system 400, including a transmitter 402 and a receiver 404, in accordance with some demonstrative embodiments. In one embodiment, transmitter 402 and/or receiver 404 may perform the functionality of transmitter 106 (FIG. 1) and/or receiver 132 (FIG. 1), respectively.

Transmitter 402 may include, for example, a plurality of Tx paths 407 to transmit via a plurality of respective Tx antennas 418 a wireless MIMO transmission 420 including data of an input stream 406, e.g., including signals 105 (FIG. 1). Each of Tx paths 407 may include, for example, a BB encoding chain 408, a Tx beamforming module 410, a to frequency-to-time-domain transform module 412, a DAC module 414, and/or RF front-end 416, e.g., in analogy to BB encoding chain 308, Tx beamforming module 310, frequency-to-time-domain transform module 312, DAC module 314, and/or RF front-end 316 as are described above with reference to FIG. 3.

In some embodiments, receiver 404 may include a plurality of Rx paths 422 to receive transmission 420 via a plurality of respective Rx antennas 424. Each of Rx paths 422 may include, for example, a RF front end 426, an ADC module 428, and/or a time to frequency domain transform module 430, e.g., in analogy to RF front end 326, ADC module 328, and/or a time to frequency domain transform module 330, as are described above with reference to FIG. 3.

In some embodiments, receiver 404 may also include a channel estimation module 432 to estimate the channel response based on the signals received via Rx paths 422. For example, module 432 may perform the functionality of channel estimation module 142 (FIG. 1).

In some embodiments, receiver 404 may also include a CSI module 449 to determine CSI feedback data based on the channel response, e.g., including the l-bit vector selected form the predefined codebook. For example, CSI module 449 may perform the functionality of CSI module 144 (FIG. 1).

In some embodiments, CSI module 449 may include a criterion-calculator module 450 to determine a plurality of criterion values corresponding to plurality of vectors in the predefined codebook. For example, module 450 may determine the product $|H\xi|^2$ for each vector $\xi$ included in the $2^l$ vectors belonging to the predefined codebook.

In some embodiments, CSI module 449 may also include a selector 460 to select the optimal vector $\hat{v}$ out of the $2^l$ vectors in the predefined codebook, based on the plurality of criterion values, e.g., in accordance with the optimization criterion of Equation 15.

In some embodiments, CSI module 449 may also include a codeword selector 464 to select a codeword, e.g., a l-bit codeword, corresponding to the optimal vector $\hat{v}$, as determined by module 460. The selected codeword may be fed back to transmitter 402 as part of CSI feedback data 482, e.g., using feedback module 148 (FIG. 1).

In some embodiments, receiver 404 may also include a decoder 466 to decode received transmission 420 based on data 462 corresponding to the optimal vector $\hat{v}$ selected by module 449, e.g., as described above. Receiver 404 may also include a BB decoding chain 470 of one or more BB modules to output a data stream 472, e.g., including signals 133 (FIG. 1), based on the decoded stream 468.

Figure 5:
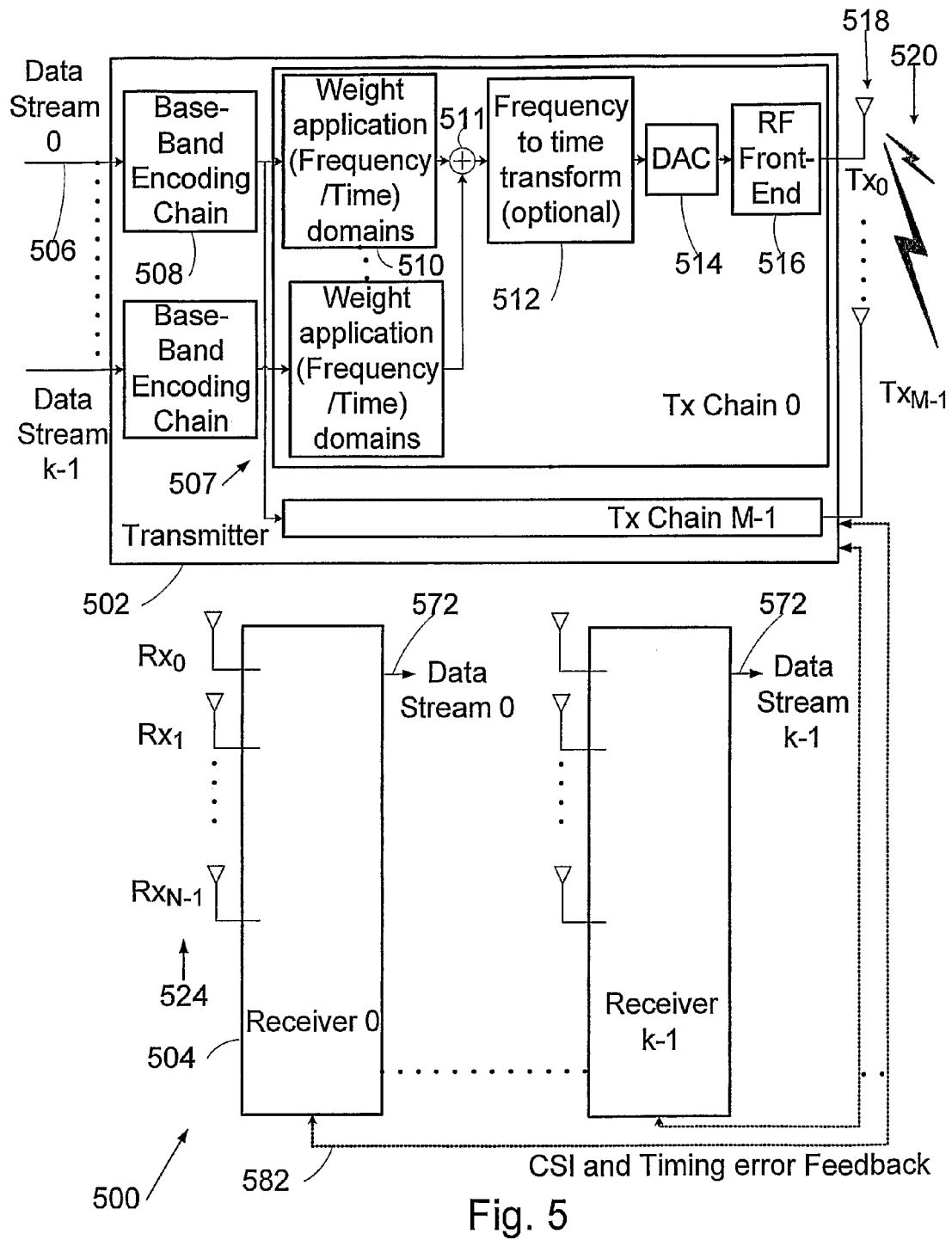
FIG. 5 is a schematic illustration of a MIMO communication system, in accordance with some demonstrative embodiments.

Reference is made to FIG. 5, which schematically illustrates a MIMO communication system 500, including a transmitter 500 and a plurality of K receivers 572 denoted Receiver0 . . . Receiver K−1, in accordance with some demonstrative embodiments. In one embodiment, transmitter 502 and/or receivers 572 may perform the functionality of transmitter 106 (FIG. 1) and/or receiver 132 (FIG. 1), respectively.

Transmitter 502 may include, for example, a plurality of Tx paths 507 to transmit via a plurality of respective Tx antennas 518 a plurality of K wireless MIMO transmissions 520 to the K receivers 572, respectively. The K Transmissions 520 may include data of a plurality of K respective inputs streams 506. Each of Tx paths 507 may include, for example, K BB encoding chains 508, e.g., in analogy to BB encoding chain 308 (FIG. 3); K Tx beamforming modules 510, e.g., in analogy to Tx beamforming module 310 (FIG. 3); and a combiner 511 to combine the outputs of the K Tx beamforming modules 510. Each Tx path may also include a frequency-to-time-domain transform module 512, a DAC module 514, and/or a RF front-end 516, e.g., in analogy to frequency-to-time-domain transform module 312, DAC module 314, and/or RF front-end 316 as are described above with reference to FIG. 3.

In some embodiments, at least one of receivers 572, e.g., each of receivers 572, may perform the functionality of receiver 404 (FIG. 4). For example, the K receivers 572 may feedback to transmitter 502 K respective CSI feedbacks 582. Each CSI feedback 582 may represent a respective codeword, which may be selected by each receiver 572, for example, based on the optimal vector $\hat{v}$, which in turn may be selected by each receiver 572 out of the $2^l$ vectors in the predefined codebook, e.g., as described above.

Figure 6:
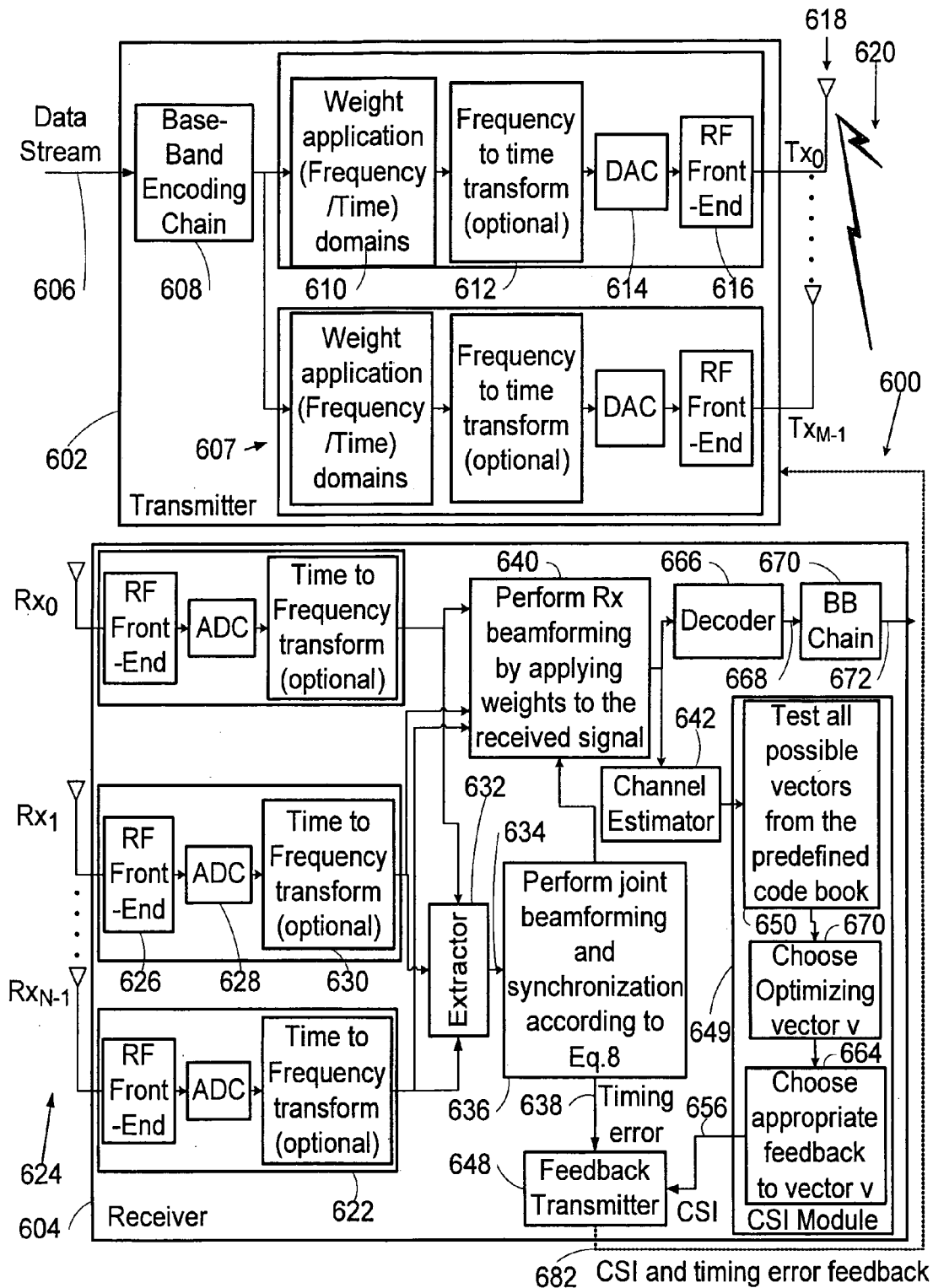
FIG. 6 is a schematic illustration of a MIMO communication system, in accordance with some demonstrative embodiments.

In some embodiments, a receiver, e.g., receiver 132 (FIG. 1), may be implemented as part of any suitable communication system, e.g., a SIMO communication system or a MIMO communication system, e.g., as described above. Although in the embodiments shown in FIGS. 3, 4 and 5, a receiver includes either a joint beamforming-synchronization module or a CSI module, respectively, in other embodiments a receiver may include both a joint beamforming and synchronization module, e.g., and a CSI module, e.g., as shown in FIG. 6.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination is with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication system comprising:
a receiver to process a wireless transmission received via a plurality of receive antennas, the receiver including:
a joint beamforming-synchronization module to jointly determine, based on a plurality of training signals, both a synchronization-error value and a beamforming weight vector, wherein the synchronization-error value represents a synchronization error corresponding to the wireless transmission, and wherein the beamforming weight vector includes a plurality of weights to be applied to signals of the wireless transmission received via the plurality of antennas, respectively,
wherein the joint beamforming-synchronization module is to jointly determine the synchronization-error value and the beamforming weight vector based on a solution of a predefined optimization criterion relating to both the synchronization-error value and the beamforming weight vector, the optimization criterion includes minimizing a sum of a plurality of difference values corresponding to the plurality of training signals, respectively,
wherein each difference value includes a difference between a result value and an expected predefined value of a training signal, said result value results from applying to the training signal a weight corresponding to the training signal, and a synchronization-error factor representing the synchronization-error of the training signal.

2. The system of claim 1, wherein the joint beamforming-synchronization module is to determine the solution of the optimization criterion by applying a recursive estimation filter to the optimization criterion.

3. The system of claim 2, wherein the recursive estimation filter includes an extended Kalman filter.

4. The system of claim 1, wherein the receiver includes a beamformer to apply the beamforming weight vector to the signals of the wireless transmission.

5. The system of claim 1, wherein the receiver includes an extractor to extract the training signals from the wireless transmission.

6. The system of claim 1, wherein the receiver includes a feedback module to output a temporal offset value.

7. The system of claim 1, wherein the training signals include a training sequence.

8. The system of claim 1, wherein the training signals include pilot symbols.

9. The system of claim 1 including the plurality of receive antennas to receive the wireless transmission.

10. A method of wireless communication, the method including:
receiving a wireless transmission via a plurality of receive antennas; and
jointly determining, based on a plurality of training signals, both a synchronization-error value and a beamforming weight vector, wherein the synchronization-error value represents a synchronization error corresponding to the wireless transmission, and wherein the beamforming weight vector includes a plurality of weights to be applied to signals of the wireless transmission received via the plurality of antennas, respectively,
wherein jointly determining the synchronization-error value and the beamforming weight vector comprises jointly determining the synchronization-error value and the beamforming weight vector based on a solution of a predefined optimization criterion relating to both the synchronization-error value and the beamforming weight vector, the optimization criterion includes minimizing a sum of a plurality of difference values corresponding to the plurality of training signals, respectively,
wherein each difference value includes a difference between a result value and an expected predefined value of a training signal, the result value results from applying to the training signal a weight corresponding to the training signal, and a synchronization-error factor representing the synchronization-error of the training signal.

11. The method of claim 10 comprising determining the solution of the optimization criterion by applying a recursive estimation filter to the optimization criterion.

12. The method of claim 11, wherein the recursive estimation filter includes an extended Kalman filter.

13. The method of claim 10 comprising applying the beamforming weight vector to the signals of the wireless transmission.

14. The method of claim 10 comprising extracting the training signals from the wireless transmission.

15. The method of claim 10 comprising outputting a temporal offset value.

16. The method of claim 10, wherein the training signals include pilot symbols.

* * * * *